United States Patent [19]

Byrne et al.

[11] Patent Number: 5,336,312
[45] Date of Patent: Aug. 9, 1994

[54] BISMUTH-CONTAINING COLORANTS

[75] Inventors: Christine J. Byrne, Olmsted Township, Cuyahoga County; Robert P. Blonski, North Royalton; John J. Welch, Cleveland, all of Ohio

[73] Assignee: Ferro Corporation, Cleveland, Ohio
[21] Appl. No.: 59,732
[22] Filed: May 10, 1993

Related U.S. Application Data

[63] Continuation of Ser. No. 690,675, Apr. 24, 1991, abandoned.
[51] Int. Cl.$^5$ ............... C04B 14/30; C04B 14/36
[52] U.S. Cl. ................. 106/479; 106/436; 106/437; 106/439; 106/441; 106/449; 106/453; 106/455; 106/456; 106/459; 106/461; 423/593
[58] Field of Search ............. 106/436, 437, 439, 441, 106/449, 453, 455, 456, 459, 461, 479; 423/593

[56] References Cited

U.S. PATENT DOCUMENTS

| | | | |
|---|---|---|---|
| 3,773,535 | 11/1973 | Burgyan et al. | 106/434 |
| 4,026,722 | 5/1977 | Hess | 106/479 |
| 4,063,956 | 12/1977 | Higgins | 106/442 |
| 4,115,141 | 9/1978 | Piltingsrud | 106/479 |
| 4,115,142 | 9/1978 | Hess | 106/461 |
| 4,230,500 | 10/1980 | Balducci et al. | 106/479 |
| 4,251,283 | 2/1981 | Balducci et al. | 106/427 |
| 4,272,296 | 6/1981 | Balducci et al. | 106/461 |
| 4,316,746 | 2/1982 | Rustioni et al. | 106/461 |
| 4,455,174 | 6/1984 | Wienand et al. | 106/479 |
| 4,752,460 | 6/1988 | Herren | 423/593 |
| 4,851,049 | 7/1989 | Wienand et al. | 106/479 |

FOREIGN PATENT DOCUMENTS

| | | |
|---|---|---|
| 0074049 | 8/1982 | European Pat. Off. |
| 0271813 | 9/1987 | European Pat. Off. |
| 3221338 | 6/1982 | Fed. Rep. of Germany |
| 3315850 | 4/1983 | Fed. Rep. of Germany |
| 3315851 | 4/1983 | Fed. Rep. of Germany |
| 3643247 | 12/1985 | Fed. Rep. of Germany |

OTHER PUBLICATIONS

Article from The Bulletin of the Bismuth Institute, entitled "Bismuth Vanadate-Molybdate: A New Yellow Pigment", (1988).
Armstrong et al., "Bismuth Titanate Solid Solutions", Mat. Res. Bull., vol. 7, pp. 1025-1034 (1972).
Hutchison, Anderson, and Rao, Electron Microscopy of Ferroelectric Bismuth Oxides Containing Perovskite Layers, (United Kingdom, 1977).
Shebanov et al., New Bismuth-Bearing Compounds $Bi_2AB_2O_9$; May. 14, 1984.
Osipyan et al., (Layered Bismuth Vanadate Ferroelectrics), May 5, 1985.
Subbanna et al., Superstructures Exhibited by Oxides of the Aurivillius Family, $(Bi_2O_2)^{2+}(A_{n-1}B_nO_{3n+1})^{2-}$, (United Kingdom, Jul. 7, 1986).
Translated Abstract of German Patent Disclosure No. 3135281.
Bismuth Institute Reprint, A Bismuth-Containing Pigment: Molybdenum-Tungsten Yellow (Date Unknown).

Primary Examiner—Helene Klemanski
Assistant Examiner—Scott L. Hertzog
Attorney, Agent, or Firm—Rankin, Hudak & Hill

[57] ABSTRACT

This invention relates to colorants represented by the formula $$Bi_2A_{x-1}D_xO_y$$

wherein: A is selected from the group consisting of Bi, Ba, Sr, Ca, Y, La, or a mixture of two or more thereof; D is selected from the group consisting of V, Mo, Mn, Ti, Ta, Nb, W, Sb, Fe, Cr, Sn, Ce, or a mixture of two or more thereof; x is a number that is at least 1; and y is the number of oxygens needed to fulfill the valence requirements of Bi, A and D; with the proviso that when A is Bi, D is other than a mixture consisting of V and Mo. These colorants are useful in providing colored compositions including: organic compositions such as plastics, rubbers, and the like; inorganic compositions such as ceramics, porcelain enamels, and the like; and coating compositions such as paints, printing inks, and the like; etc. The invention also provides for processes for making such colorants and for making such colored compositions. The invention also provides for such colorants in the form of particulate solids (e.g., pigments) having one or more protective coatings applied to the surface of such solids.

7 Claims, 2 Drawing Sheets

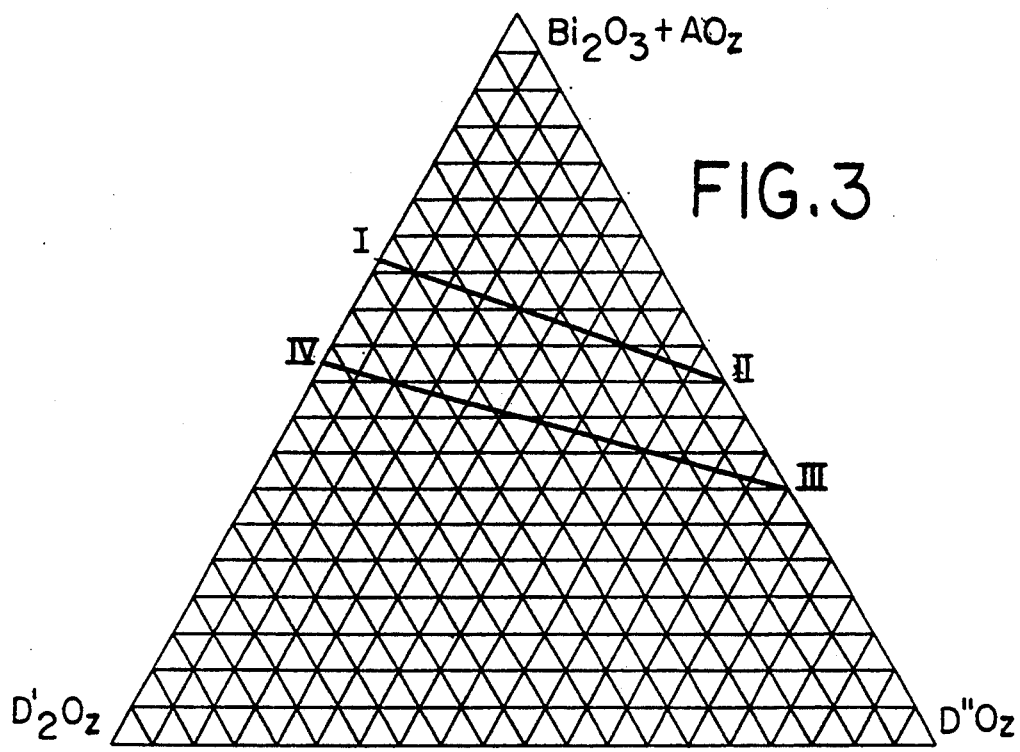
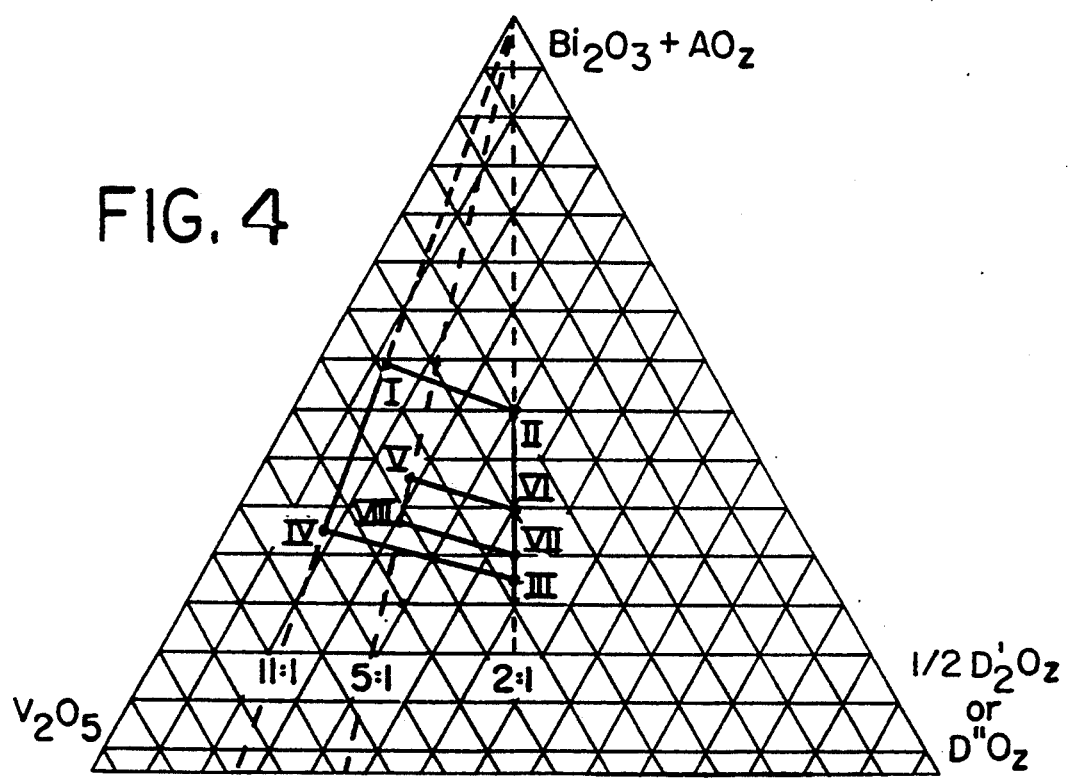

BISMUTH-CONTAINING COLORANTS

This is a continuation of copending application(s) Ser. No. 07/690,675 filed on Apr. 24, 1991, now abandoned.

TECHNICAL FIELD

This invention relates to bismuth-containing colorants and their use in colored compositions (e.g., organic compositions such as plastics, rubbers, and the like; Inorganic compositions such as ceramics, porcelain enamels, and the like; coating compositions such as paint, printing ink, and the like; etc.), and to processes for making such colorants and such colored compositions. This invention also relates to bismuth-containing colorants in the form of particulate solids (e.g., pigments) which have one or more protective coatings applied to the surface of such solids.

BACKGROUND OF THE INVENTION

Cadmium sulfide and lead chromate are among the most commonly used yellow pigments. Unfortunately these pigments are toxic and thus there is a need for alternative yellow pigments. In the search for such alternative yellow pigments, interest has focused on the use of the bismuth-vanadate pigments. U.S. Pat. 4,026,722 discloses the use of bismuth-vanadate pigments represented by the formula $$BiVO_4.xAl_2O_3.ySiO_2$$

wherein x is about 0.25-2.0, y is about 0.1-3.5, and the sum of x and y is equal to or greater than 1. U.S. Pat. No. 4,063,956 discloses the use of monoclinic bismuth vanadate pigment containing a precoat of one or more porous hydrous oxides (e.g., aluminum, silicon, titanium, etc.) and a dense overcoat of amorphous silica.

U.S. Pat. Nos. 4,115,141 and 4,115,142 describe the use of monoclinic bismuth vanadate as a yellow pigment for coloring plastics and paints. These pigments are prepared by reacting bismuth nitrate with an alkali vanadate to obtain a bismuth-vanadate gel and then subjecting the gel to aqueous digestion or calcination to produce the bismuth-vanadate pigment.

U.S. Pat. No. 4,230,500 discloses greenish-yellow, yellow and orange-yellow pigments which consist substantially of bismuth vanadate of monoclinic structure, bismuth phosphate of monoclinic structure and aluminum phosphate of orthorhombic structure and which, in the case of yellow and orange-yellow pigments also comprise a compound derived from $Bi_2O_3$ and $V_2O_5$.

U.S. Pat. No. 4,251,283 discloses greenish-yellow pigments based on $BiVO_4$ made by the calcination, in the presence of air, of a mixture of $BiPO_4$, $V_2O_5$ and an oxide of Ca, Ba, Mg or Zn.

U.S. Pat. No. 4,272,296 discloses bismuth-vanadate based yellow pigments diluted with 10-90% by weight of orthorhombic $BaSO_4$.

U.S. Pat. No. 4,316,746 discloses molybdenum- or tungsten-containing, bismuth-vanadate yellow pigments represented by the formula $$Bi_{(1-x/3)}M_xV_{1-x}O_4$$

wherein M is Mo or W, x varies from 0.075 to 0.317 when M is Mo and from 0.059-0.265 when M is W. The reference indicates that these pigments may also contain a crystalline phase consisting of orthorhombic $BaSO_4$.

U.S. Pat. No. 4,455,174 discloses a bismuth-vanadate yellow pigment represented by the formula $$BiVO_4.xBi_2MoO_6.yBi_2WO_6$$

wherein x is 0.6-2.25 and y is 0-0.1. These pigments are prepared by a process in which a solution containing a bismuth (III) salt, a vanadate and a molybdate is acidified until the Ph is less than zero. The pH of the acidic solution is then brought to 0.1-3.5 at 20°-95° C. by means of an alkaline solution which may or may not contain a dissolved tungsten (VI) compound. The precipitated product and the reaction solution are left at 50°-100° C. for 30-120 minutes, and then separated from one another. The product is washed, dried, if required, and heated at 300°-800° C. Example 2 discloses the preparation of a pigment represented by the formula $BiVO_4.0.2Bi_2MoO_6$ which corresponds to $Bi_7V_5MoO_{26}$. German Offenlegungsschrift 3135281, which is the priority document upon which U.S. Pat. No. 4,455,174 is based, indicates that in the above formula, both x and y have values in the range of 0-3 and the sum of x and y is in the range of 0.1-3.

U.S. Pat. No. 4,752,460 discloses bismuth/vanadate/molybdate and bismuth/vanadate/tungstenate pigments represented by the formula $$(Bi,A)(V,D)O_4$$

wherein: A is an alkaline earth metal or zinc or mixture thereof; D is Mo, W or mixture thereof; the molar ratio of A:Bi is in the range of 0.1-0.4; and the molar ratio of D:V is in the range of 0-0.4. The notation (Bi,A) means that the bismuth is present in the form of the bismuth (III) ion and is partly replaced by the divalent metal cation A. Vanadium is present as the vanadium (V) ion in the form of the vanadate ion and can be partly replaced by the hexavalent metal cation D as molybdate or tungstenate or mixtures thereof. The reference indicates that these pigments are in the form of tetragonal, scheelitelike crystal structures, and can be coated with an inorganic protective coating such as a silicon compound and a texture-improving agent such as wax.

R. A. Armstrong et al, "Bismuth Titanate Solid Solutions", *Mat. Res. Bull.* Vol. 7, pp. 1025-1034 (1972) indicates that ferro-electric $Bi_4Ti_3O_{13}$ can be described as a sequence of alternating $$(Bi_2O_2)^{2+} \text{ and } (Bi_2Ti_3O_{10})^{2-}$$

layers stacked along a common axis. The $Bi_2Ti_3O_{12}$ units possess perovskitelike structures with corner-linked $TiO_6$ octahedra surrounding twelve coordinated bismuth ions. Bismuth oxide layers similar in structure to lead oxide separate the perovskite layers. The reference indicates that several di- and trivalent ions substitute readily for bismuth in the perovskite layer, but the octahedral site and the bismuth oxide layer are far less flexible, tolerating only very limited solid solution.

G. N. Subbanna et al, "Super Structures Exhibited by Oxides of the Aurivillius Family, $(Bi_2O_2)^{2+}(A_{n-1}B_nO_{3n+1})^{2-}$", *Mat. Res. Bull.*, Vol. 22, pp. 205-209 (1987), discloses that $Bi_5Ti_3FeO_{15}$ and $Bi_7Ti_3Fe_3O_{21}$, which are n=4 and n=6 members of the family of oxides of the general formula $$(Bi_2O_2)^{2+}(A_{n-1}B_nO_{3n+1})^{2-}$$

consist of $(A_{n-1}B_nO_{3n+1})^{2+}$ perovskite layers located between two $(Bi_2O_2)^{2+}$ layers. The reference indicates that these oxides show unusual super structures, possibly due to cation ordering.

SUMMARY OF THE INVENTION

This invention relates to colorants represented by the formula $$Bi_2A_{x-1}D_xO_y$$

wherein: A is selected from the group consisting of Bi, Ba, Sr, Ca, Y, La, or a mixture of two or more thereof; D is selected from the group consisting of V, Mo, Mn, Ti, Ta, Nb, W, Sb, Fe, Cr, Sn, Ce, or a mixture of two or more thereof; x is a number that is at least 1; and y is the number of oxygens needed to fulfill the valence requirements of Bi, A and D; with the proviso that when A is Bi, D is other than a mixture consisting of V and Mo. These colorants are useful in providing colored compositions including: organic compositions such as plastics, rubbers, and the like; inorganic compositions such as ceramics, porcelain enamels, and the like; and coating compositions such as paints, printing inks, and the like; etc. The invention also provides for processes for making such colorants, and to a process for making such colored compositions. The invention also provides for such colorants in the form of particulate solids (e.g., pigments) having one or more protective coatings applied to the surface of such solids.

BRIEF DESCRIPTION OF THE DRAWINGS

FIG. 3 is a ternary diagram expressed in molar quantities disclosing compositions of colorants that are provided for in accordance with another embodiment of the invention.

FIG. 4 is a ternary diagram in molar quantities disclosing compositions of colorants that are provided for in accordance with another embodiment of the invention.

DESCRIPTION OF THE PREFERRED EMBODIMENTS

The colorants that are provided for in accordance with the present invention are represented by the formula $$Bi_2A_{x-1}D_xO_y \quad (I)$$

wherein: A is selected from the group consisting of Bi, Ba, Sr, Ca, Y, La, or a mixture of two or more thereof; D is selected from the group consisting of V, Mo, Mn, Ti, Ta, Nb, W, Sb, Fe, Cr, Sn, Ce, or a mixture of two or more thereof; x is a number that is at least 1; and y is the number of oxygens needed to fulfill the valence requirements of Bi, A and D; with the proviso that when A consists solely of Bi, D is other than a mixture consisting solely of V and Mo. In one embodiment of the invention, these colorants are pigments that are red-toned, orange, yellow, green or a combination thereof.

In Formula (I), x is preferably a number in the range of 1 to about 10, more preferably about 2 to about 6, more preferably about 3 to about 6.

In one embodiment of the invention, A is Bi, Y, La or a mixture of two or more thereof. In another embodiment, A comprises Bi. In another embodiment, A is Ba, Sr, Ca, Y, La or a mixture of two or more thereof. In still another embodiment of the invention, A is a mixture of Bi with one or more of Ba, Sr, Ca, Y or La.

In one embodiment of the invention, D is Ti, Sn, Ce, Mo, W or a mixture of two or more thereof. In another embodiment, D is V, Cr, Nb, Sb, Ta, Fe or a mixture of two or more thereof. In still another embodiment, D is V, Mo, Ti, Sn or a mixture of two or more thereof.

In one embodiment of the invention D is a mixture consisting of V and Mo. In this embodiment, the molar ratio of V to Mo is preferably in the range of about 11:1 to about 2:1, more preferably about 5:1.

In one embodiment of the invention, the colorants provided for herein are crystalline structures represented by the formula $$(Bi_2O_2)^{2+}(A_{n-1}D_nO_{3n+1})^{2-} \quad (II)$$

wherein: said crystalline structure comprises one or more layers of $(A_{n-1}D_nO_{3n+1})^{2-}$ stacked between layers of $(Bi_2O_2)^{2+}$; and n is the number of layers of $(A_{n-1}D_nO_{3n+1})^{2-}$ stacked between layers of $(Bi_2O_2)^{2+}$ and is at least 1; with the proviso that when A is Bi, D is other than a mixture consisting of V and Mo. In Formula (II), A and D have the same meanings as in Formula (I). n is preferably a number in the range of 1 to about 10, more preferably 2 to about 6, more preferably 3 to about 6.

In the embodiments wherein A is not present or A consists solely of Bi, D is other than a mixture consisting solely of V and Mo. When D is a mixture consisting solely of a mixture of V and Mo, A must be present and is either (1) Bi in combination with one or more of Ba, Sr, Ca, Y or La, or (2) one or more of Ba, Sr, Ca, Y or La. The intention herein is that the colorants represented by Formulae (I) or (II) are other than pigments made up solely of Bi, V, Mo and O.

Figure 1:
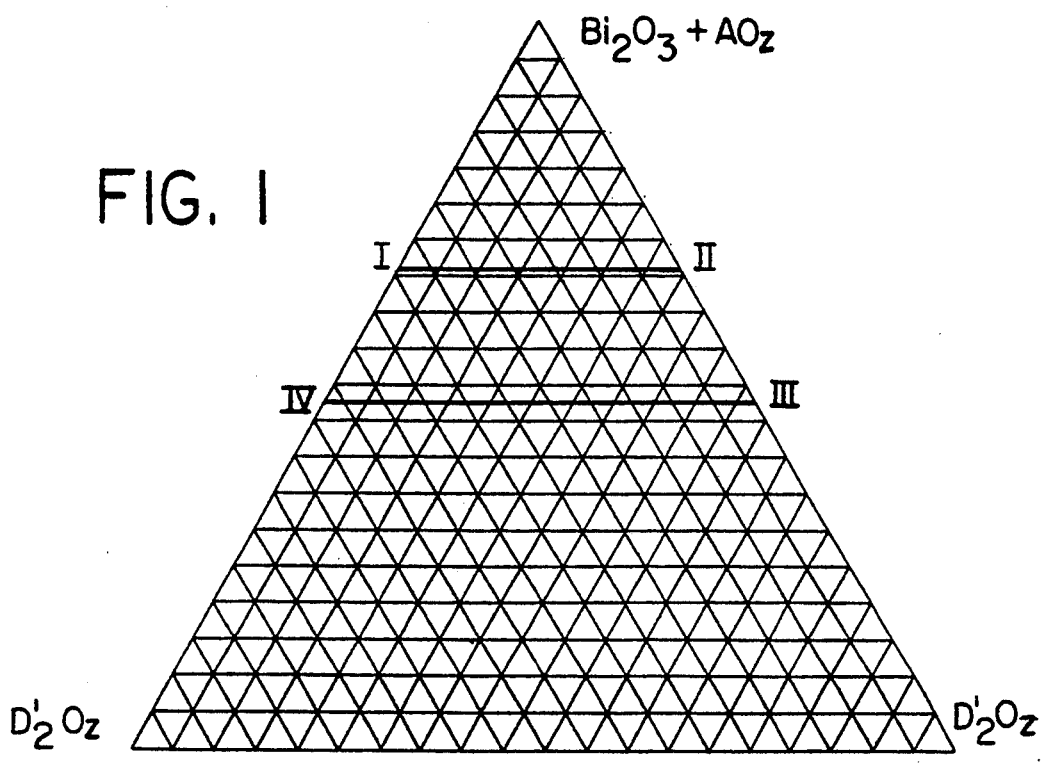
FIG. 1 is a ternary diagram expressed in molar quantities disclosing compositions of colorants that are provided for in accordance with one embodiment of the invention.

In one embodiment of the invention, the compounds of Formulae (I) or (II) have compositions within the quadrilateral defined by the points I, II, III and IV of FIG. 1. In FIG. 1, $AO_z$ refers to $La_2O_3$, $Y_2O_3$, 2CaO, 2BaO, 2SrO, or a mixture thereof. Up to about 35% on a molar basis, more preferably up to about 25%, more preferably up to about 15% of the $Bi_2O_3$ can be replaced by $AO_z$. In FIG. 1, $D'_2O_z$ refers to $V_2O_5$, $Cr_2O_3$, $Nb_2O_5$, $Sb_2O_3$, $Ta_2O_5$ or $Fe_2O_3$. The corners of the quadrilateral I-II-III-IV of FIG. 1 have the following compositions, in terms of molar percentage:

|     | $Bi_2O_3 + AO_z$ | $D'_2O_z$ |
| --- | --- | --- |
| I   | 66.7 | 33.3 |
| II  | 66.7 | 33.3 |
| III | 52.4 | 47.6 |
| IV  | 52.4 | 47.6 |

Figure 2:
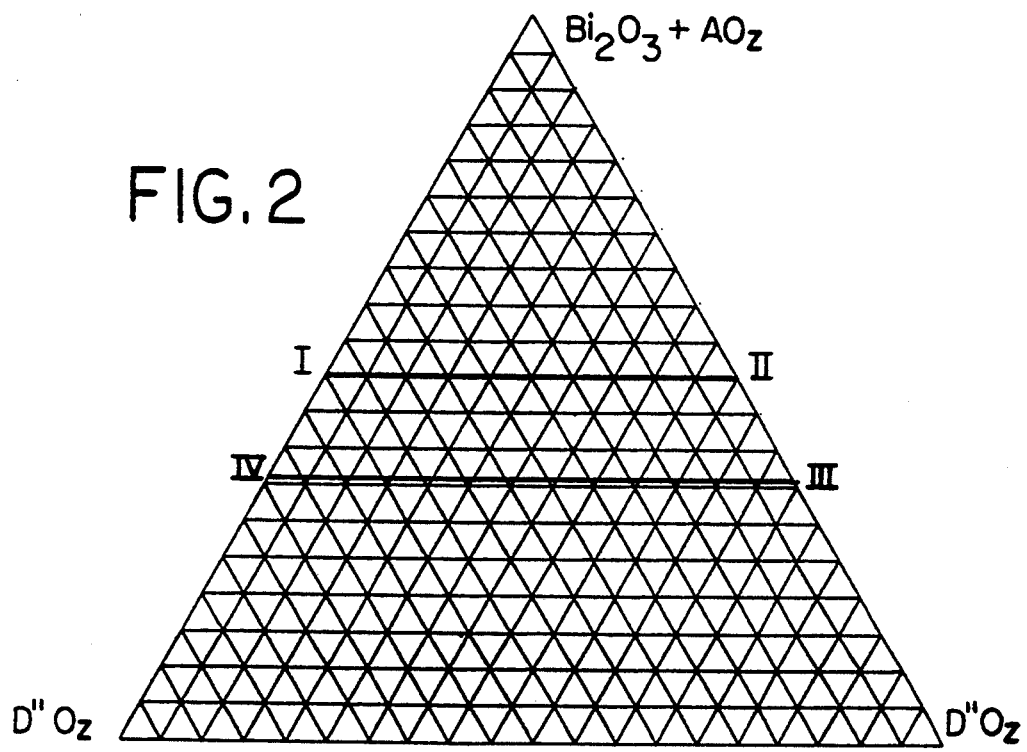
FIG. 2 is a ternary diagram expressed in molar quantities disclosing compositions of colorants that are provided for in accordance with another embodiment of the invention.

In one embodiment of the invention, the compounds of Formulae (I) or (II) have compositions within the quadrilateral defined by the corners I, II, III and IV of FIG. 2. In FIG. 2, $AO_z$ refers to $La_2O_3$, $Y_2O_3$, 2CaO, 2BaO, 2SrO, or a mixture thereof. Up to about 35% on a molar basis, more preferably up to about 25%, more preferably up to about 15% of the $Bi_2O_3$ can be replaced by $AO_z$. In FIG. 2, $D''O_z$ refers to $TiO_2$, $SnO_2$, $CeO_2$, $MoO_3$ or $WO_3$. The corners of the quadrilateral I-II-III-IV of FIG. 2 have the following compositions, in terms of molar percentage:

|     | $Bi_2O_3 + AO_z$ | $D''O_z$ |
| --- | --- | --- |
| I   | 50   | 50   |
| II  | 50   | 50   |
| III | 35.5 | 64.5 |
| IV  | 35.5 | 64.5 |

In one embodiment of the invention, the compounds of Formulae (I) or (II) have compositions within the quadrilateral defined by the points I, II, III and IV of FIG. 3. In FIG. 3, $AO_z$ refers to $La_2O_3$, $Y_2O_3$, 2CaO, 2BaO, 2SrO, or a mixture thereof. Up to about 35% on a molar basis, more preferably up to about 25%, more preferably up to about 15% of the $Bi_2O_3$ can be replaced by $AO_z$. In FIG. 3, $D'_2O_z$ refers to $V_2O_5$, $Cr_2O_3$, $Nb_2O_5$, $Sb_2O_3$, $Ta_2O_5$ or $Fe_2O_3$. $D''O_z$ refers to $TiO_2$, $SnO_2$, $CeO_2$, $MoO_3$ or $WO_3$. The corners of the quadrilateral I-II-III-IV of FIG. 3 have the following compositions, in terms of molar percentage:

|     | $Bi_2O_3 + AO_z$ | $D'_2O_z$ | $D''O_z$ |
| --- | --- | --- | --- |
| I   | 66.7 | 33.3 | 0   |
| II  | 50   | 0   | 50  |
| III | 35.5 | 0   | 65.5 |
| IV  | 52.4 | 47.6 | 0   |

In one embodiment of the invention, the compounds of Formulae (I) or (II) have compositions within the quadrilateral defined by the points I, II, III and IV of FIG. 4. In FIG. 4, $AO_z$ refers to $La_2O_3$, $Y_2O_3$, 2CaO, 2BaO, 2SrO, or a mixture thereof. Up to about 35% on a molar basis, more preferably up to about 25%, more preferably up to about 15% of the $Bi_2O_3$ can be replaced by $AO_z$. In FIG. 4, $D'_2O_z$ refers to $V_2O_5$, $Cr_2O_3$, $Nb_2O_5$, $Sb_2O_3$, $Ta_2O_5$ or $Fe_2O_3$. $D''O_z$ refers to $TiO_2$, $SnO_2$, $CeO_2$, $MoO_3$ or $WO_3$. In FIG. 4, the designations 11:1, 5:1 and 2:1 refer to molar the ratio of $V_2O_5$ to $\frac{1}{2}D'_2O_z$ or $D''O_z$. These molar ratios are provided for at all points on the vertical lines marked by such designations that extend from the uppermost corner or apex of FIG. 4 downwardly. The line referring to a molar ratio of 2:1 passes through points II, VI, VII and III and thus at each of said points II, VI, VII and III the molar ratio of $V_2O_5$ to $\frac{1}{2}D'_2O_z$ or $D''O_z$ is 2:1. Similarly, the line referring to a molar ratio of 5:1 passes through points V and VIII and thus the molar ratio of $V_2O_5$ to $\frac{1}{2}D'_2O_z$ or $D''O_z$ at such points is 5:1. The line referring to a molar ratio of 11:1 passes through points I and IV and thus the molar ratio of $V_2O_5$ to $\frac{1}{2}D'_2O_z$ or $D''O_z$ at such points is 11:1. The corners of the quadrilateral I-II-III-IV of FIG. 4 have the following compositions, in terms of molar percentage:

|     | $Bi_2O_3 + AO_z$ | $V_2O_5$ | $\frac{1}{2}D'_2O_z$ or $D''O_z$ |
| --- | --- | --- | --- |
| I   | 64.9 | 29.8 | 5.3  |
| II  | 60   | 20   | 20   |
| III | 45.5 | 27.3 | 27.2 |

-continued

|     | $Bi_2O_3 + AO_z$ | $V_2O_5$ | $\frac{1}{2}D'_2O_z$ or $D''O_z$ |
| --- | --- | --- | --- |
| IV  | 50   | 42   | 8   |

In one embodiment of the invention, the compounds of Formulae (I) or (II) have compositions within the quadrilateral defined by the points V, VI, VII and VIII of FIG. 4. The corners of the quadrilateral V-VI-VII-VIII have the following compositions, in terms of molar percentages:

|      | $Bi_2O_3 + AO_z$ | $V_2O_5$ | $\frac{1}{2}D'_2O_z$ or $D''O_z$ |
| ---  | --- | --- | --- |
| V    | 53.3 | 33.35 | 13.35 |
| VI   | 50   | 25    | 25    |
| VII  | 45.7 | 27.15 | 27.15 |
| VIII | 49   | 36.4  | 14.6  |

In one embodiment of the invention, the compounds of Formulae (I) or (II) are made by a co-precipitation process comprising the steps of:

(A) preparing a first aqueous composition having a pH preferably in the range of about 0.5 to about 5, more preferably about 1 to about 4;

(B) preparing a second aqueous composition comprising at least one salt of bismuth or bismuth metal, and optionally at least one salt of component A or the metal A, and having a pH preferably in the range of about 0.2 to about 5, more preferably about 0.5 to about 4;

(C) preparing a third aqueous composition comprising at least one salt of component D or the metal D; with the proviso that if component A is not present or if component A consists solely of Bi, component D is other than a mixture consisting solely of V and Mo; said third aqueous composition preferably having a pH that is less acidic (i.e., more alkaline) than said second aqueous composition;

(D) adding said second aqueous composition and said third aqueous composition simultaneously to said first aqueous composition to form a fourth aqueous composition comprising precipitated solids, said precipitated solids comprising Bi, component D and optionally component A;

(E) maintaining said fourth aqueous composition from step (D) at a temperature preferably in the range of about 25° C. to about 90° C., more preferably about 30° C. to about 70° C. for up to about 3 hours, preferably up to about 2 hours;

(F) deliquifying said fourth aqueous composition from step (E) to provide deliquified solids; and (G) heating said dell quilled solids from step (F) at a sufficient temperature and for an effective period of time to provide said bismuth-containing composition.

The first aqueous composition preferably has a temperature in the range of about 25° C. to about 90° C., more preferably about 30° C. to about 70° C. Any inorganic acid can be used to provide the required pH for the first aqueous composition. These include nitric acid, hydrochloric acid and sulfuric acid.

The bismuth salt and the salt of component A that are used to form the second aqueous composition are preferably nitrates, oxalates, carbonates, oxides, hydroxides, sulfates or halides (e.g., chlorides). Examples of such bismuth salts include $Bi_2(NO_3)_3.5H_2O$, $Bi(OH)_3$, $BiCl_3$, $Bi_2O_2SO_4.H_2O$ and $Bi_2O_2CO_3$. Examples of salts of component (A) that are useful include $BaMoO_4$, $Ba(OH)_2.H_2O$, $BaC_2O_4.H_2O$, $BaO$, $CaCO_3$, $Ca(OH)_2$, $CaMoO_4$, $CaSO_4.2H_2O$, $Ca(NO_3)_2.4H_2O$, $CaO$, $CaC_2O_4.H_2O$, $Y_2O_3$, $Y_2(CO_3)_3.3H_2O$, $Y(NO_3)_3.4H_2O$, $YCl_3.H_2O$, $Y(OH)_3$, $Y_2(SO_4)_3.8H_2O$, $La_2(CO_3)_3.8H_2O$, $LaCl_3$, $La(OH)_3$, $La_2(C_2O_4)_3.9H_2O$, $La_2O_3$, $SrCO_3$, $SrC_2O_4.H_2O$, $SrSO_4$, $Sr(OH)_2$ and $SrMoO_4$. The concentration of bismuth in the second aqueous composition is preferably in the range of about 0.25 to about 4 gram-moles per liter, more preferably about 0.35 to about 2.5 gram-moles per liter. The concentration of component A in the second aqueous composition is preferably up to about 1.5 gram-moles per liter, more preferably in the range of about 0.2 to about 0.8 gram-moles per liter. Any inorganic acid can be used to provide the desired pH for the second aqueous composition, with nitric acid, sulfuric acid and hydrochloric acid being preferred. The temperature of the second aqueous composition is preferably in the range of about 25° C. to about 70° C., more preferably about 30° C. to about 55° C.

The salts of component D that are used in the third aqueous composition are preferably alkali metal (e.g., Na, K) or ammonium salts, nitrates, oxalates, carbonates, oxides, hydroxides, sulfates or halides (e.g., chlorides). Examples include $NH_4VO_3$, $Na_3VO_4$, $NaVO_3$, $Na_2MoO_4.2H_2O$, $TiO_2$, $5TiO_2N_2O_5.6H_2O$, $K_2TiO(C_2O_4)_2.2H_2O$, $Ti_2(SO_4)_3.8H_2O$, $TiCl_4$, $TiOSO_4$, $SnCl_4.5H_2O$, $SnCl_2.2H_2O$, $SnC_2O_4$, $SnSO_4$, $SnO_2$, $SnO_2.xH_2O$. Any base can be used to provide the desired pH. Examples of useful bases include $NaOH$, $NH_4OH$ and $KOH$. The concentration of component D in the third aqueous composition is preferably from about 0.1 to about 4 gram-moles per liter, more preferably about 0.5 to about 2 gram-moles per liter. The temperature of the third aqueous composition during step (C) is preferably in the range of about 25° C. to about 90° C., more preferably about 30° C. to about 50° C.

During step (D) the second and third aqueous compositions are added to the first aqueous composition simultaneously to effect the formation of the fourth aqueous composition comprising an aqueous solution containing precipitated solids. The precipitated solids comprise Bi, component D and optionally component A. The simultaneous addition of the second and third aqueous compositions to the first aqueous composition is critical to achieving the precipitation of solids that have superior colorant characteristics. The addition is preferably conducted at steady flow rates of each of said second and third aqueous compositions. The addition can be effected over a period of about one-half to about 4 hours, more preferably about one-half to about 2 hours. The first aqueous composition is preferably subjected to agitation during such addition. The flow rate of the second aqueous composition can be in the range of about 2 to about 10 cc/minute, more preferably about 4 to about 8 cc/minute. The flow rate of the third aqueous composition can be in the range of about 1 to about 8 cc/minute, more preferably about 2 to about 7 cc/minute. The temperature of the fourth aqueous composition is preferably in the range of about 25° C. to about 90° C., more preferably about 30° C. to about 70° C. The pH of the fourth aqueous composition is preferably in the range of about 0.5 to about 6, more preferably about 1 to about 5.

The concentrations of Bi, component D and component A in the second and third aqueous compositions, and the amount of such second and third aqueous compositions that are added to the first aqueous composition are interdependent and selected so as to provide for ratios of Bi to component D to component A in the final product in accordance with ratios indicated in Formulae (I) or (II). Thus, for example, if the concentration of Bi in the second aqueous composition is relatively high, the amount of such second aqueous composition that is added to the first aqueous composition during step (D) is relatively low. Similarly, if the amount of Bi that is added during step (D) is relatively low, the amounts of component D and component A that are added during step (D) are also relatively low in order to provide the desired ratios of Bi to component D to component A.

An effective amount of a base can be added to the fourth aqueous composition subsequent to step (D) but prior to step (E) to increase the concentration of bismuth in the precipitate. Examples of such bases include sodium, potassium or ammonium hydroxide. Typically, sufficient base is added to raise the pH of the fourth aqueous composition to a level in the range of about 1 to about 6, more preferably about 1 to about 4. Preferably, the base is added over a period of 1 to about 3 hours, more preferably about 1 to about 2 hours.

After the additions during step (D) are completed and any additional base is added, the fourth aqueous composition is maintained at a temperature preferably in the range of about 25° C. to about 90° C., more preferably about 25° C. to about 70° C. for preferably up to about 3 hours, more preferably up to about 2 hours. The precipitated solids are then separated from the fourth aqueous composition using conventional techniques (e.g., filtration), and preferably washed and dried. The solids are then heated at a sufficient temperature for an effective period of time to provide a bismuth-containing solids composition corresponding to Formulae (I) or (II). In one embodiment of the invention, this heating step is conducted at a sufficient temperature and for an effective period of time to provide a single-phase crystalline structure. The heating (or calcination) step (G) can be conducted using a single step or a multi-step heating cycle. In one embodiment of the invention the temperature of the solids is increased to a peak temperature in the range of preferably about 525° C. to about 950° C. over a period of preferably about 1 minute to about 10 hours, maintained at said peak temperature for preferably about 1 to about 20 hours, and cooled to ambient temperature. In another embodiment, the temperature of the solids is increased to a peak temperature in the range of preferably about 525° C. to about 675° C., more preferably about 575° C. to about 625° C., more preferably about 600° C., over a period of preferably about 1 to about 20 minutes, maintained at said peak temperature for preferably about 1 to about 10 hours, more preferably about 2 to about 6 hours, more preferably about 4 hours, and cooled to ambient temperature. In another embodiment, the temperature of the solids is increased to an intermediate temperature in the range of preferably about 450° C. to about 550° C., more preferably about 490° C. to about 510° C., more preferably about 500° C., over a period of preferably about 1 to about 4 hours, more preferably about 2 hours, maintained at said intermediate temperature for about 1 to about 4 hours, more preferably about 2 hours, increased to a peak temperature in the range of about 600° C. to about 700° C., more preferably about 625° C. to about 675° C., more preferably about 650° C., over a period of about 1 to about 4 hours, more preferably about 2 hours, maintained at said peak temperature for about 1 to about 10 hours, more preferably about 2 to about 6 hours, more preferably about 4 hours, and cooled to ambient temperature. In another embodiment, the temperature of the solids is increased to an intermediate temperature in the range of about 250° C. to about 450° C. over a period of about 1 to about 10 minutes, maintained at said intermediate temperature for preferably about 1 to 10 hours, more preferably about 1 to about 4 hours, more preferably about 2 hours, increased to a peak temperature in the range of preferably about 525° C. to about 675° C. over a period of about 1 to about 10 minutes, maintained at said peak temperature for about 1 to about 10 hours, more preferably about 1 to about 4 hours, more preferably about 2 hours, and cooled to ambient temperature. In another embodiment, the temperature of the solids is increased to an intermediate temperature in the range of about 550° C. to about 625° C., more preferably about 575° C. to about 625° C., more preferably about 600° C., over a period of about 1 to about 4 hours, more preferably about 2 hours, maintained at said intermediate temperature for preferably about 1 to about 10 hours, more preferably about 2 to about 6 hours, more preferably about 4 hours, increased to a peak temperature in the range of preferably about 650° C. to about 950° C., more preferably about 700° C. to about 900° C., over a period of about 1 to about 4 hours, more preferably about 2 hours, maintained at said peak temperature for about 1 to about 10 hours, more preferably about 2 to about 6 hours, more preferably about 4 30 hours, and cooled to ambient temperature. In each of the foregoing embodiments the solids are preferably oven-cooled from the peak temperature to ambient temperature over a period of about 0.5 to about 16 hours, more preferably about 4 to about 12 hours.

In one embodiment of the invention, the compounds of Formulae (I) or (II) are made using a solid-state process comprising the steps of:
(A') preparing a mixture comprising metallic Bi or at least one compound of Bi, metallic D or at least one compound of component D, and optionally metallic A or at least one compound of component A;
(B') increasing the temperature of said mixture from step (A') to an intermediate temperature, preferably in the range of about 550° C. to about 625° C., more preferably about 590° C. to about 610° C., more preferably about 600° C., over a period of preferably up to about 4 hours, more preferably about 1 to about 3 hours, more preferably about 2 hours;
(C') maintaining the temperature of said mixture at said intermediate temperature for preferably about 1 to about 10 hours, more preferably about 2 to about 6 hours, more preferably about 4 hours;
(D') increasing the temperature of said mixture from said intermediate temperature to a peak temperature in the range of preferably about 650° C. to about 950° C., more preferably about 700° C. to about 900° C., over a period of preferably up to about 4 hours, more preferably about 1 to about 3 hours, more preferably about 2 hours;
(E') maintaining the temperature of said mixture at said peak temperature for preferably about 1 to about 20 hours, more preferably about 2 to about 16 hours, more preferably about 2 to about 6 hours, more preferably about 4 hours; and
(F') cooling said mixture from step (E') to ambient temperature, preferably over a period of about 8 to about 24 hours, more preferably about 10 to about 16 hours, to provide the bismuth-containing composition of Formulae (I) or (II).

In one embodiment of the invention, the peak temperature during step (D') is preferably in the range of about 675° C. to about 725° C. In another embodiment the peak temperature during step (D') is preferably in the range of about 725° C. to about 775° C. In another embodiment, the peak temperature during step (D') is preferably in the range of about 775° C. to about 825° C. In another embodiment the peak temperature during step (D') is preferably in the range of about 825° C. to about 875° C. In still another embodiment the peak temperature during step (D') is preferably in the range of about 875° C. to about 925° C.

In one embodiment of the invention, the compounds of Formulae (I) or (II) are made using a solid-state process comprising the steps of:
(A'') preparing a mixture comprising metallic Bi or at least one compound of Bi, metallic D or at least one compound of component D, and optionally metallic A or at least one compound of component A;
(B'') increasing the temperature of said mixture from step (A') to a peak temperature, preferably in the range of about 500° C. to about 700° C., more preferably about 550° C. to about 650° C., more preferably about 575° C. to about 625° C., more preferably about 600° C., over a period of preferably up to about 4 hours, more preferably about 1 to about 3 hours, more preferably about 2 hours;
(C'') maintaining the temperature of said mixture at said peak temperature for preferably about 1 to about 60 hours, more preferably about 1 to about 20 hours, more preferably about 1 to about 10 hours, more preferably about 1 to about 4 hours; and
(D'') cooling said mixture from step (C'') to ambient temperature, preferably over a period of about 4 to about 48 hours, more preferably about 10 to about 24 hours to provide the bismuth-containing composition of Formulae (I) or (II).

The bismuth compound that is used during steps (A') or (A'') is preferably $Bi_2O_3$ or a precursor of $Bi_2O_3$. Examples of such precursors include bismuth metal, $Bi_2MO_3O_{12}$ and $Bi(VO_3)_3$. The compounds of component D and component A that are useful are preferably oxides, carbonates, hydroxides, oxalates or nitrates. Examples of the compounds of component D include $TiO_2$, $SnO_2$, $CeO_2$, $MoO_3$, $WO_3$, $V_2O_5$, $Cr_2O_3$, $Ta_2O_5$, $Fe_2O_3$, $Sb_2O_3$, $Sb_2O_5$, $Nb_2O_5$, or a mixture of two or more thereof. Precursors of the foregoing can be used, examples of which include $NH_4VO_3$, $Bi_2Mo_3O_{12}$, $Bi(VO_3)_3$, $Bi_{16}CrO_{27}$, $Bi_2WO_6$, $CeVO_4$, , $V_2MoO_8$, $BiCrO_3$. Examples of the compounds of component A include $Bi_2O_3$, $La_2O_3$, $Y_2O_3$, CaO, BaO, SrO and mixtures of two or more thereof. Precursors of the foregoing compounds can also be used, examples of which include $Bi_3YO_6$, $BaBiO_3$ and $CaBi_2O_4$. The ratios of Bi to component D to component A that are used in steps (A') or (A'') are selected so as to provide for ratios Bi to D to A in the final product in accordance with the ratios indicated in Formulae (I) or (II).

With each of the inventive processes, the solids are reduced to a desired particle size, preferably in the range of about 0.1 to about 2 μm, more preferably about 0.1 to about 1 μm, using techniques known in the art (e.g., grinding, crushing, etc.).

In the event the product solids from any of the inventive processes contain more than a single crystalline phase, which can be detected using x-ray diffraction, it is preferred that the solids be heated again to a temperature in the range of about 700° C. to about 900° C. for preferably about 1 to about 20 hours, more preferably about 1 to about 10 hours, to obtain a single phase product. This reheating step can be repeated until a preferred, single-phase product is obtained.

The temperatures that these compositions are heated to are dependent upon the particular elements that are used for components A and D, it being desired that the melting point of the composition represented by Formulae (I) or (II) not be exceeded during heating. When component D comprises Mo, it is preferred that the peak temperature not exceed about 700° C. When D comprises Cr, it is preferred that the peak temperature not exceed about 750° C. When D comprises Ti, Sn, W or Ce it is preferred that the peak temperature not exceed about 800° C. When D comprises Sb, Nb or Ta it is preferred that the peak temperature not exceed about 900° C.

To improve the properties (e.g., stability to heat, light and chemical attacks), of the colorants used herein, it is advantageous to coat the compounds of Formulae (I) or (II) during their preparation or in an aftertreatment in accordance with known processes with an inorganic protective coating. For this purpose, inorganic substances such as aluminum, titanium, antimony, cerium, zirconium, silicon compounds, zinc phosphate or mixtures thereof are applied as a coating to the compound of Formulae (I) or (II). This coating application can be carried out in one or more stages using known techniques. The amount of inorganic coating agent that is applied is preferably up to about 50% by weight, more preferably about 2% to about 50% by weight, more preferably about 5% to 50% by weight, based on the combined weight of the colorant and coating agent.

To improve certain pigment properties, the compounds of Formulae (I) and (II) can be treated with one or more texture-improving agents. These include, for example, long-chain aliphatic alcohols, esters, acids or salts thereof, amines, amides, waxes or resinous substances, such as abietic acid, hydrogenation products, esters or salts thereof. Also included are nonionic, anionic or cationic surface-active agents. These texture-improving agents are applied as a coating to the colorant using known techniques. The coating can be applied to the compound of Formulae (I) or (II) with or without first applying an inorganic coating of the type referred to above. If used in combination with such inorganic coating, the texture-improving agent is applied as a second coat or overcoat overlying the inorganic protective coating. The amount of texture-improving agent that is used is preferably up to about 70% by weight, more preferably about 0.1% to about 70% by weight, based on the total weight of the resulting product.

In one embodiment of the invention, the compounds of Formulae (I) or (II) are pigments that are initially coated with at least one coating of silica. Then at least one coating of at least one wax such as a polyolefin wax is applied over the silica coating to provide a pigment with enhanced abrasion resistance and color stability. The amount of silica that is applied is preferably up to about 50% by weight, more preferably 2% to about 50% by weight, more preferably about 5% to about 50% by weight, based on the combined weight of the pigment and the silica. The amount of wax that is applied is preferably up to about 70% by weight, more preferably about 0.1% to about 70% by weight, based on the total weight of the resulting product. The procedures and materials used for coating lead chromate pigments with silica and polyolefin wax disclosed in U.S. Pat. No. 3,773,535 at Col. 2, line 22 to Col. 7, line 68 are applicable to coating the pigments used herein; the foregoing section of U.S. Pat. No. 3,773,535 is incorporated herein by reference for its disclosure of such coating procedures and materials.

The compounds of Formulae (I) and (II) have good pigment properties and are suitable for coloring organic compositions such as plastics, rubbers, and the like; inorganic compositions such as ceramics, porcelain enamels, and the like; and coating compositions such as paint, printing ink, and the like. The color exhibited by these compounds is dependent upon the particular components employed but generally is yellow, orange, red-toned, green or a combination thereof.

The plastic or rubber compositions and coating compositions that can be colored according to the invention are based on polymeric materials that can be of natural or synthetic origin. Examples include natural resins or drying oils, rubber or casein. Also included are modified natural substances, such as chlororubber, oil-modified alkyd resins, viscose, cellulose ethers or esters, such as cellulose acetate, cellulose propionate, cellulose acetobutyrate or nitrocellulose. Also included are wholly synthetic organic polymers (thermosets and thermoplastics) obtained by polymerization, polycondensation or polyaddition. Examples include polyolefins, such as polyethylene, polypropylene or polyisobutylene, substituted polyolefins such as polymers of vinyl chloride, vinyl acetate, styrene, acrylonitrile, acrylic acid and/or methacrylic acid esters, butadiene, as well as copolymers of the monomers mentioned above, in particular ABS or EVA. Examples from the series of polyaddition and polycondensation resins are the condensation products of formaldehyde with phenols, phenolic resins, and the condensation products of formaldehyde with urea, thiourea and melamine, amino resins, polyesters, including not only saturated, for example alkyd resins, but also unsaturated, for example maleic resins, linear polyesters, polyamides and polycarbonates or silicones. These polymeric materials can be present individually or as mixtures, as plastic materials or melts which if desired can be spun into fibers. They can also be present in dissolved form as film formers or binders for lacquers, paints or printing inks, for example linseed oil varnish, nitrocellulose, alkyd resins, melamine resins and urea-formaldehyde resins or acrylic resins.

The coloring of plastic or rubber compositions with compounds of Formulae (I) or (II) is effected using known techniques, for example, by admixing a compound of this type, if desired in the form of a masterbatch, into the formulation using rolls or mixing or milling apparatus. The colored material is then brought into the desired final form by known processing techniques, such as calendaring, pressing, extruding, brushing, casting or injection molding. Frequently it is desirable, if non-rigid moldings are to be prepared or to reduce the brittleness thereof, to incorporate plasticizers into the formulation before molding. Suitable plasticizers are, for example, esters of phosphoric acid, phthalic acid or sebacic acid. The plasticizers can be incorporated into the formulation before or after the incorporation of the compounds of Formulae (I) or (II) into such formulations. It is further possible, for the purpose of obtaining different colors, to add to the formulation, in addition to the compounds of Formulae (I) or (II), fillers or other coloring constituents such as white, color or black pigments, in any desired amounts.

To color coating compositions such as paints and printing inks, the polymeric materials mentioned above and the compounds of Formulae (I) or (II), if desired together with additives, such as fillers, other pigments, siccatives or plasticizers, are finely dispersed or dissolved in a common organic solvent or solvent mixture or water. This can be done by dispersing or dissolving the individual components separately or together in groups, and then combining all the components.

The ceramics that can be colored using the compounds of Formulae (I) and (II) encompass a wide variety of engineering materials, other than metals and alloys, that are chemically Inorganic and are rendered serviceable through high temperature processing. These ceramics are normally composed of both cationic and anionic species; their primary difference from other materials being in the nature of their chemical bonding. They are sometimes referred to as ionic solids, i.e., possessing ionic bonding. The ceramics that can be colored include, single crystals, polycrystalline materials, glass-bonded aggregates, insulating foams and wholly vitreous substances. These include glasses, glazes and porcelain or vitreous enamels.

The raw materials used in making these ceramics are primarily clay, including shale and mudstone, silica, and feldspar. Other raw materials include a wide variety of rocks, minerals and synthetic compounds used to manufacture diverse products.

The clays are of three principal families: kaolinite, $Al_4Si_4O_{10}(OH)_8$, montmorillonite, $X_yAl_2(Al_ySi_{4-y}O_{10})(OH)_2$ where X is usually Na, Mg, or Al, and illite, $K_y(AlFeMg_4Mg)(Al_ySi_{8-y})O_{20}(OH)_4$. Closely associated minerals are gibbsite, $Al(OH)_3$, diaspore, $HAlO_2$, and bauxite (of indefinite composition but usually given as $Al_2O_3.2H_2O$ which is an intermediate between the first two). All clays have as the major constituents one or more of these minerals. The kaolinite group includes kaolinite, halloysite, dickite, and nacrite. The montmorillonite group includes montmorillonite, nontronite, beidellite, hectorite, and saponite. The illite group, similar to muscovite but containing less potassium, more silica, and more combined water, includes the illites, the hydromicas, phengite, brammallite, glaucomite, and celadonite. There is a wide range of substitutions that occur in each family. In addition, most clays have one or more accessory minerals, e.g., quartz, muscovite, biotite, limonite, hydrous micas, feldspar, vermiculate, and/or carbonaceous matter.

The clays that can be used are sometimes referred to by names that reflect their use. For example: a pottery clay is used to make pottery; a sewer-pipe clay is used for sewer pipe; fire-clays (or refractory clay) are used to manufacture fireclay bricks, crucibles, refractory mortars, etc.; china clay is used to manufacture whitewares; slip clays are used for glazing stoneware and porcelain; and brick clays are used to manufacture common brick and face brick.

The silica can be in the form of quartz, tridymite, cristobalite, vitreous silica, cryptocrystalline forms, hydrated silica, and diatomite. Sources of silica that are useful include sandstones, quartzites, and sands.

Feldspars are used chiefly as fluxes and sources of $Al_2O_3$, $SiO_2$, alkalies ($K_2O$, $Na_2O$), and CaO. The plagioclase feldspars vary in composition from albite, $NaAlSi_3O_8$, to anorthite, $CaAl_2Si_2O_8$, in a continuous series of solid solutions. Orthoclase and microcline feldspar ($KAlSi_3O_8$) are referred to as potash feldspar. Anorthoclase, $(Na,K)AlSi_3O_8$, is a combination of albite and potash feldspar. High soda feldspars are used in glasses and glazes.

Other nonclay minerals include nepheline syenite, a rock that contains a large percentage of the mineral nephelite, $(Na,K)_2Al_2Si_2O_8$, along with some soda and potash feldspars; lime, derived by calcination of limestone chiefly calcium carbonate, $CaCO_3$, which is used in glazes, enamels, and glasses; magnesium silicates such as talc (used as a flux with clays), asbestos (used chiefly for insulating refractories), and olivine (used for refractory products; fluxing minerals which lower the vitrification temperature, the melting temperature or the reaction temperature, e.g., lithium minerals spodumene, $Li_2Al_2Si_4O_{12}$, lepidolite, $[K_2Li_3Al_3]-(Al_2Si_6O_{20}(OH,F)_4]$, amblygonite, $Li_2F_2Al_2-P_2O_8$, and petralite, $LiAlSi_4O_{10}$, as well as barium minerals such as barite, $BaSO_4$, and whiterite, $BaCO_3$; refractory minerals such as zirconium minerals, hydrated alumina minerals, titania, $TiO_2$ thoria $ThO_2$ graphite magnesite, dolomite, gypsum, chromite, the aluminum silicates, and pyrophyllite.

The forming methods used in the production of these ceramics include plastic deformation (e.g., extrusion, dry pressing and hot forming methods) and casting (e.g., slip and fusion casting). The compounds of Formulae I or II are blended with the other constituents of the ceramic formulation using conventional colorant or pigment blending techniques. In preparing materials for forming, optimal particle size and size distribution may be obtained by crushing and grinding the various materials, separating the various size fractions by screening, and then blending the desired size fractions of each material. In cold forming, the ceramic ware is made oversize and shrinks during firing and drying. In hot forming (e.g., hot pressing, hot extrusion, hot rolling, forging and swaging, hot isostatic pressing, and chemical vapor deposition), the ceramic ware is made close to its final size.

Thermal treatment is an essential step in the manufacturing of these ceramics. Materials that are stable at room temperature have to be raised to relatively high temperatures (ranging from about 700° C. for enamels to about 1650° C. for alumina ceramics) for reactions to take place. Thermal treatment is a smoothly varying time-temperature profiled rather than a particular temperature held for some time period. To determine firing temperature and quality control, thermocouples, radiation pyrometers, and optical pyrometers are used. Expendable pyrometric cones can be used for structural clay products, porcelains and sanitary ware. Microstructures and properties of many specialty ceramics vary according to time-temperature profile and often require precise monitoring of thermal gradients and temperature.

Drying and binder removal generally occurs between about 0°–400° C. The ceramic loses physically held water and organic binders which are used in the forming operation. Firing occurs at higher temperatures, and involves these changes: dissociation, the loss of carbon dioxide by carbonate constituents of ceramic compositions; compound formation, the continued heating of clays which results in the formation of mullite, $3Al_2O_3.2SiO_2$; polymorphic transformation of materials capable of existing in more than one crystallographic arrangement, e.g., silica and zirconia; sintering, the fabrication of a product usually involving densification by pore removal through diffusional mechanisms; and vitrification.

The porcelain enameling process involves the re-fusing of powdered glass on a metal surface. The powdered glass is prepared by ball-milling the desired porcelain enamel glass. The compounds of Formulae I or II are blended with the powdered glass using conventional blending techniques. The glass is smelted from raw batch materials. The smelter can be a box-shaped tank furnace. A continuous smelter, wherein the thoroughly mixed raw batch is fed in at one end and molten glass is flowing out at the other end, can be used. Decomposition, gas evolution, and solution occur during smelting. After the molten glass is smelted to a homogeneous liquid, it is poured in a thin stream of water or onto cooled metal rollers. This quenched glass, termed frit, is a friable material easily reduced to small particles by a ball-milling operation. Ball-milling the glass frit into small sized particles can be carried out whether the frit is wet or dry. Dry powders are used for dry-process cast-iron enameling and for electrostatic application on sheet steel. Dry powders are also prepared and marketed for the subsequent preparation of slurries and slips used in the wet-process application techniques.

The compounds of Formulae (I) or (II) are present in the colored compositions of the invention at a suitable level to provide the desired degree of coloring. These compounds are typically employed at concentration levels in the range of about 0.001% to about 40% by weight, more preferably about 0.01% to about 20% by weight based on the total weight of the colored compositions.

The compounds of Formulae (I) and (If) are characterized by good general pigment properties, such as good dispersibility, high tinctorial strength, purity, high hiding power, good overlacquering, migration, heat, light and weathering resistance, and good resistance to chemicals, such as acids, bases, organic solvents and industrial atmosphere. In addition they confer on the printing inks, paints and lacquers prepared therefrom good rheological behavior, and on the dried films a high gloss.

The following examples are provided for purposes of exemplifying the invention. Unless otherwise indicated, in the following examples as well as throughout the specification and claims, all parts and percentages are by weight, all temperatures are in degrees centigrade, and all pressures are atmospheric.

EXAMPLE 1

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 169.8 gins of $Bi(NO_3)_3.5H_2O$ and 7.9 gms of $TiOSO_4$ to the resulting solution. A third aqueous composition is prepared by adding 20 gms of NaOH and 29.3 gms of $NH_4VO_3$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 2

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 169.8 gms of $Bi(NO_3)_3.5H_2O$ to the resulting solution. A third aqueous composition is prepared by adding 20 gms of NaOH, 29.3 gms of $NH_4VO_3$ and 9.35 gms of $SnO_2.2H_2O$ to 350 ml of water. The second aqueous compost t ion and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 3

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 169.8gms of $Bi(NO_3)_3.5H_2O$ and 5.7 gms of $TiOSO_4$ to the resulting solution. A third aqueous composition is prepared by adding 20 gms of NaOH, 29.3 gms of $NH_4VO_3$ and 3.1 gms $Na_2MoO_4.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 4

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 169.8 gms of $Bi(NO_3)_3.5H_2O$ and 7.9 gms of $TiOSO_4$ to the resulting solution. A third aqueous composition is prepared by adding 20 gms of NaOH, 29.3 gms of $NH_4VO_3$ and 6.1 gms of $Na_2MoO_4.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 5

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 169.8 gms of $Bi(NO_3)_3.5H_2O$ and 1.9 gms of $TiOSO_4$ to the resulting solution. A third aqueous composition is prepared by adding 20 gms of NaOH, 29.3 gms of $NH_4VO_3$ and 9.1 gms of $Na_2MoO_4.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 6

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 121.5 gms of $Bi(NO_3)_3.5H_2O$ and 15.3 gms of BaO to the resulting solution. A third aqueous composition is prepared by adding 20 gms of NaOH, 29.3 gms of $NH_4VO_3$ and 12.1 gms of $Na_2MoO_4.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 7

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 164 gms of $Bi(NO_3)_3.5H_2O$, 5.7 gms of $TiOSO_4$ and 3.1 gms of $SrMoO_4$ to the resulting solution. A third aqueous composition is prepared by adding 20 gms of NaOH and 29.3 gms of $NH_4VO_3$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 8

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 97.5 gms of $Bi(NO_3)_3.5H_2O$ to the resulting solution. A third aqueous composition is prepared by adding 20 gms of NaOH, 11.7 gms of $NH_4VO_3$ and 9.34 gms of $SnO_2.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 9

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 40 ml of water, then adding 97.5 gms of $Bi(NO_3)_3.5H_2O$ to the resulting solution. A third aqueous composition is prepared by adding 20 gms of NaOH, 11.7 gms of $NH_4VO_3$, 6.05 gms $Na_2MoO_4.2H_2O$ and 4.7 gms of $SnO_2.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 10

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 97.5 gms of $Bi(NO_3)_3.5H_2O$ to the resulting solution. A third aqueous composition is prepared by adding 20 gms of NaOH, 11.7 gms of $NH_4VO_3$ and 9.1 gms of $Na_2MoO_4.2H_2O$ and 2.4 gms of $SnO_2.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 11

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 97.5 gms of $Bi(NO_3)_3.5H_2O$ and 8.0 gms of $TiOSO_4$ to the resulting solution. A third aqueous composition is prepared by adding 20 gms of NaOH and 11.7 gms of $NH_4VO_3$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition Is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 12

A first aqueous composition Is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 97.5 gms of $Bi(NO_3)_3.5H_2O$ and 2.0 gms of $TiOSO_4$ to the resulting solution. A third aqueous composition is prepared by adding 20 gms of NaOH, 11.7 gms of $NH_4VO_3$ and 9.1 gms of $Na_2MoO_4.2h_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 13

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 50 ml of concentrated nitric acid to 400 ml of water, then adding 97.5 gms of $Bi(NO_3)_3.5H_2O$ and 4.0 gms of $TiOSO_4$ to the resulting solution. A third aqueous composition is prepared by adding 20 gms of NaOH, 11.7 gms of $NH_4VO_3$ and 6.05 gms of $Na_2MoO_4.2H_2O$ to 350 ml of water. The second aqueous composition and the third aqueous composition are simultaneously added to the first aqueous composition over a period of 2 hours with the result being the formation of a fourth aqueous composition. The fourth aqueous composition comprises precipitated solids and has a pH of 1.4 and a temperature of 70° C. The pH of the fourth aqueous composition is increased to 2 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired solids composition.

EXAMPLE 14

72.15 parts of $Bi_2O_3$, 24.32 parts of $V_2O_5$ and 3.53 parts of $TiO_2$ are mixed together. The mixture is heated to 600° C. over a period of 2 hours, maintained at 600° C. for 4 hours, heated to a temperature of 800° C. over a period of 2 hours, maintained at 800° C. for 12–16 hours, and then cooled to room temperature to provide the desired product.

EXAMPLE 15

69.95 parts of $Bi_2O_3$, 23.58 parts of $V_2O_5$ and 6.46 parts of $SnO_2$ are mixed together. The mixture is heated to 600° C. over a period of 2 hours, maintained at 600° C. for 4 hours, heated to a temperature of 800° C. over a period of 2 hours, maintained at 800° C. for 12–16 hours, and then cooled to room temperature to provide the desired product.

EXAMPLE 16

67.60 parts of $Bi_2O_3$, 22.79 parts of $V_2O_5$ and 9.61 parts of $WO_3$ are mixed together. The mixture is heated to 600° C. over a period of 2 hours, maintained at 600° C. for 4 hours, heated to a temperature of 800°–850° C. over a period of 2 hours, maintained at 800°–850° C. for 12–16 hours, and then cooled to room temperature to provide the desired product.

EXAMPLE 17

69.35 parts of $Bi_2O_3$, 27.25 parts of $V_2O_5$ and 3.40 parts of $SnO_2$ are mixed together. The mixture is heated to 600° C. over a period of 2 hours, maintained at 600° C. for 4 hours, heated to a temperature of 800° C. over a period of 2 hours, maintained at 800° C. for 12 hours, and then cooled to room temperature. The resulting product is ground using a mortar and pestle, heated to 850° C. for a period of 4 hours, then cooled to room temperature to provide the desired product.

EXAMPLE 18

74.75 parts of $Bi_2O_3$, 22,05 parts of $V_2O_5$ and 3.20 parts of $TiO_2$ are mixed together. The mixture is heated to 600° C. over a period of 2 hours, maintained at 600° C. for 4 hours, heated to a temperature of 800° C. over a period of 2 hours, maintained at 800° C. for 12 hours, and then cooled to room temperature. The resulting product is ground using mortar and pestle, heated to 850° C. over a period of 4 hours, maintained at 850° C. for 4 hours, then cooled to room temperature to provide the desired product.

EXAMPLE 19

72.15 parts of $Bi_2O_3$, 20.43 parts of $V_2O_5$ and 7.42 parts of $TiO_2$ are mixed together. The mixture is heated to 600° C. over a period of 2 hours, maintained at 600° C. for 2 hours, heated to a temperature of 800° C. over a period of 2 hours, maintained at 800° C. for 12 hours, and then cooled to room temperature. The resulting product is ground using mortar and pestle, heated to 850° C. over a period of 4 hours, maintained at 850° C. for 4 hours, then cooled to room temperature to provide the desired product.

EXAMPLE 20

74.31 parts of $Bi_2O_3$, 21.21 parts of $V_2O_5$, 1.68 parts of $MoO_3$ and 2.80 parts of $TiO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 850° C. over a period of 4 hours, maintained at 850° C. for 12–16 hours, then cooled to room temperature to provide the desired product.

EXAMPLE 21

72.52 parts of $Bi_2O_3$, 20.70 parts of $V_2O_5$, 1.64 parts of $MoO_3$ and 5.15 parts of $SnO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 850° C. over a period of 4 hours, maintained at 850° C. for 12–16 hours, then cooled to room temperature to provide the desired product.

EXAMPLE 22

75.12 parts of $Bi_2O_3$, 23.04 parts of $V_2O_5$, and 1.84 parts of $TiO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 850° C. over a period of 4 hours, maintained at 850° C. for 12–16 hours, then cooled to room temperature to provide the desired product.

EXAMPLE 23

73.92 parts of $Bi_2O_3$, 22.67 parts of $V_2O_5$, and 3.41 parts of $SnO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 850° C. over a period of 4 hours, maintained at 850° C. for 12–16 hours, then cooled to room temperature to provide the desired product.

EXAMPLE 24

73.28 parts of $Bi_2O_3$, 21.44 parts of $V_2O_5$, 3.39 parts of $MoO_3$ and 1.88 parts of $TiO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 850° C. over a period of 4 hours, maintained at 850° C. for 4 hours, then cooled to room temperature to provide the desired product.

EXAMPLE 25

75.70 parts of $Bi_2O_3$, 16.88 parts of $V_2O_5$, and 7.42 parts of $TiO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 850° C. over a period of 4 hours, maintained at 850° C. for 4 hours, then cooled to room temperature to provide the desired product.

EXAMPLE 26

72.24 parts of $Bi_2O_3$, 21.67 parts of $V_2O_5$, 5.14 parts of $MoO_3$ and 0.95 parts of $TiO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 800° C. over a period of 4 hours, maintained at 800° C. for 4–8 hours, then cooled to room temperature to provide the desired product.

EXAMPLE 27

72.08 parts of $Bi_2O_3$, 21.09 parts of $V_2O_5$, 3.34 parts of $MoO_3$ and 3.49 parts of $SnO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 800° C. over a period of 4 hours, maintained at 800° C. for 4–8 hours, then cooled to room temperature to provide the desired product.

EXAMPLE 28

71.63 parts of $Bi_2O_3$, 21.49 parts of $V_2O_5$, 5.10 parts of $MoO_3$ and 1.78 parts of $SnO_2$ are mixed together. The mixture is heated to 600° C. over a period of 2 hours, maintained at 600° C. for 2 hours, heated to 800° C. over a period of 2 hours, maintained at 800° C. for 12 hours, and cooled to room temperature. The resulting product is ground using mortar and pestle, heated to 800° C. over a period of 4 hours, maintained at 800° C. for 4–8 hours, then cooled to room temperature to provide the desired product.

EXAMPLE 29

18.3 parts of $Bi_2O_3$, 6.6 parts of $V_2O_5$ and 3.2 parts of $Sb_2O_5$ are mixed together. The mixture is heated to 600° C. over a period of 2 hours, maintained at 600° C. for 50 hours and cooled to room temperature. The resulting product is ground using mortar and pestle, heated at 750° C for 10 hours and cooled to room temperature. The resulting product is ground, heated at 800° C. for 10 hours, then cooled to room temperature. The resulting product is ground, heated to 850° C. for 4 hours, then cooled to room temperature to provide the desired product.

EXAMPLE 30

18.3 parts of $Bi_2O_3$, 6.6 parts of $V_2O_5$ and 2.9 parts of $Nb_2O_5$ are mixed together. The mixture is heated to 600° C. over a period of 2 hours, maintained at 600° C. for 50 hours and cooled to room temperature. The resulting product is ground using mortar and pestle, heated at 750° C for 10 hours and cooled to room temperature. The resulting product is ground, heated at 800° C. for 10 hours, then cooled to room temperature. The resulting product is ground, heated to 850° C. for 4 hours, then cooled to room temperature to provide the desired product.

EXAMPLE 31

18.3 parts of $Bi_2O_3$, 6.6 parts of $V_2O_5$ and 4.9 parts of $Ta_2O_5$ are mixed together. The mixture is heated to 600° C. over a period of 2 hours, maintained at 600° C. for 50 hours and cooled to room temperature. The resulting product is ground using mortar and pestle, heated at 750° C. for 10 hours and cooled to room temperature. The resulting product is ground, heated at 800° C. for 10 hours, then cooled to room temperature. The resulting product is ground, heated to 850° C. for 4 hours, then cooled to room temperature to provide the desired product.

EXAMPLE 32

19.3 parts of $Bi_2O_3$, 5.5 parts of $V_2O_5$ and 5.2 parts of $Sb_2O_5$ are mixed together. The mixture is heated to 600° C. over a period of 2 hours, maintained at 600° C. for 2 hours and cooled to room temperature. The resulting product is ground using mortar and pestle, heated at 800° C. for 2 hours and cooled to room temperature. The resulting product is ground, heated at 900° C. for 10 hours, then cooled to room temperature to provide the desired product.

EXAMPLE 33

19.4 parts of $Bi_2O_3$, 6.5 parts of $V_2O_5$ and 4.0 parts of $Sb_2O_5$ are mixed together. The mixture is heated to 600° C. over a period of 2 hours, maintained at 600° C. for 50 hours and cooled to room temperature. The resulting product is ground using mortar and pestle, heated at 800° C. for 2 hours and cooled to room temperature. The resulting product is ground, heated at 900° C. for 10 hours, then cooled to room temperature to provide the desired product.

EXAMPLE 34

19.5 parts of $Bi_2O_3$, 7.1 parts of $V_2O_5$ and 3.3 parts of $Sb_2O_5$ are mixed together. The mixture is heated to 600° C. over a period of 2 hours, maintained at 600° C. for 50 hours and cooled to room temperature. The resulting product is ground using mortar and pestle, heated at 800° C. for 2 hours and cooled to room temperature. The resulting product is ground, heated at 900° C. for 10 hours, then cooled to room temperature to provide the desired product.

EXAMPLE 35

19.6 parts of $Bi_2O_3$, 7.9 parts of $V_2O_5$ and 2.4 parts of $Sb_2O_5$ are mixed together. The mixture is heated to 600° C. over a period of 2 hours, maintained at 600° C. for 50 hours and cooled to room temperature. The resulting product is ground using mortar and pestle, heated at 800° C. for 2 hours and cooled to room temperature. The resulting product is ground, heated at 900° C. for 10 hours, then cooled to room temperature to provide the desired product.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A colored composition comprising a material capable of being colored and an effective amount of at least one colorant to impart color to said material, said colorant comprising at least one crystalline structure represented by the formula $$(Bi_2O_2)^{2+}(A_{n-1}D_nO_{3n+1})^{2-}$$

wherein
said crystalline structure comprises one or more layers of $(A_{n-1}D_nO_{3n+1})^{2-}$ stacked between layers of $(Bi_2O_2)^{2+}$;
n is the number of layers $(A_{n-1}D_nO_{3n+1})^{2-}$ stacked between layers of $(Bi_2O_2)^{2+}$ and is at least 1;
A is selected from the group consisting of Bi, Ba, Sr, Ca, Y, La, or a mixture of two or more thereof; and
D comprises V and at least one element selected from the group consisting of Mo, Mn, Ti, Ta, Nb, Sb, Fe, Cr, Sn, and Ce;
with the proviso that when A is Bi, D is other than a mixture consisting of V and Mo.

2. The composition of claim 1 wherein n is a number in the range of 1 to about 10.

3. The composition of claim 1 wherein D comprises a mixture comprising V and Ti.

4. The composition of claim 3 wherein D comprises a mixture comprising V, Ti and Mo.

5. The composition of claim 1 wherein D comprises a mixture of V and Sn.

6. The composition of claim 5 wherein D comprises a mixture of V, Sn and Mo.

7. The composition of claim 1 wherein the colorant is single-phase.

* * * * *